June 23, 1959  D. M. POTTER  2,891,403
SPECIFIC GRAVITY METER

Filed Dec. 20, 1956  2 Sheets-Sheet 1

INVENTOR
DAVID M. POTTER.
BY Berry + Crews
ATTORNEYS.

June 23, 1959  D. M. POTTER  2,891,403
SPECIFIC GRAVITY METER
Filed Dec. 20, 1956  2 Sheets-Sheet 2
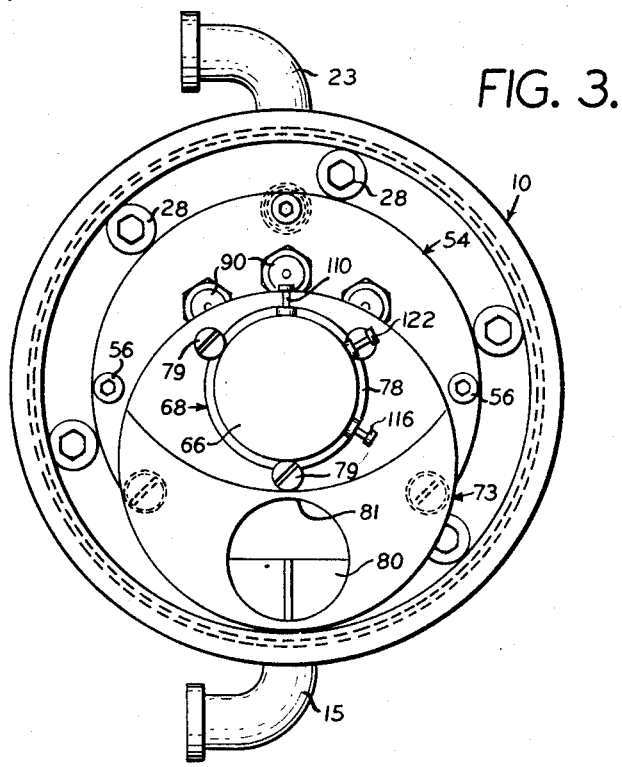
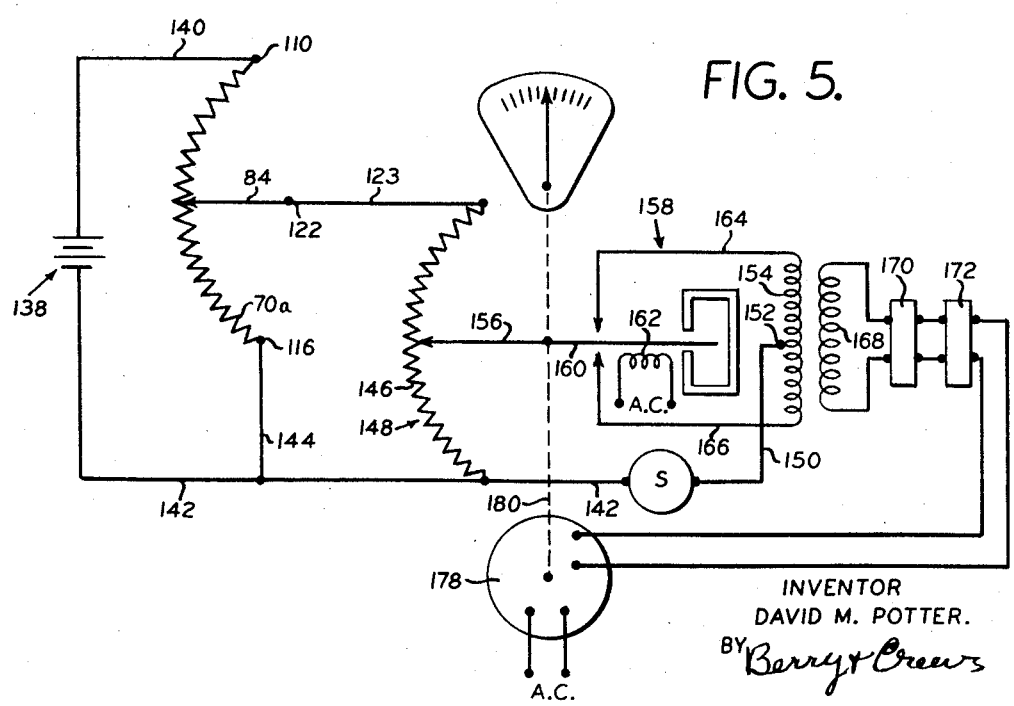
INVENTOR
DAVID M. POTTER.
BY Berry & Crews
ATTORNEYS.

United States Patent Office 2,891,403
Patented June 23, 1959

2,891,403

SPECIFIC GRAVITY METER

David M. Potter, Warren Township, N.J.

Application December 20, 1956, Serial No. 629,727

10 Claims. (Cl. 73—453)

This invention relates to mechanism for accurately measuring the density of specific gravity of a liquid and for either indicating or utilizing the measurement secured. Since density is always proportional to specfic gravity, and in the metric system is numerically equal to it, the securement of one is equivalent to the securement of the other.

A submerged buoyant member, herein termed a balancing float, may be devised, having centers of mass, buoyancy and rotation, respectively, at three distinct, triangularly related points. Such a balancing float, when submerged in liquid, will assume an angular position which accurately reflects the density or specific gravity of the liquid. It is desirable that the balancing float be provided in a chamber which is completely sealed against leakage, and that measures be taken to insure that accurate information derived from the position of the float be magnetically transmitted to the outside. The matter of magnetically securing from the balancing float a measurement of density or spectific gravity which is free from error caused by the introduction of extraneous forces, presents a problem of some difficulty.

It is desirable to secure, through a potentiometer or Wheatstone bridge, a voltage output proportional to the density or specific gravity of the liquid. If a very loose magnetic coupling of constant strength is provided between the balancing float and the potentiometer rotor, the friction of the potentiometer parts will not be overcome and a true measure will not be obtained. If, on the other hand, a tight, forceful magnetic coupling of constant strength is provided, the balancing float will be pulled away from the position of free balance, a torque will be maintained, and hysteresis will result.

The primary object of the invention is to overcome the difficulty outlined so that an accurate measurement of density or specific gravity can be obtained and either indicated or utilized. To this end it is a feature that provision is made of means for constantly maintaining a loose magnetic coupling between the balancing float and the potentiometer rotor, in combination with means for intermittently providing a tight magnetic coupling between the balancing float and the potentiometer rotor. During the intervals of tight coupling, the balancing float and the potentiometer rotor are both disturbed in position, being pulled toward one another, but since the balancing float is of much greater mass than the potentiometer rotor, its movement is comparatively slow and comparatively slight. During the intervals of loose coupling the balancing float tends to recover its initial position but the potentiometer rotor does not, there being no spring or unbalanced gravity force acting upon the potentiometer rotor, and there being constant frictional resistance to movement of the potentiometer rotor. As a consequence, the potentiometer rotor is gradually pulled step by step into coincidence with the normal position of the balancing float. By employing half waves of sixty cycle frequency, the adjustment into coincidence can be completed in a period of the order of one second.

The utility of the invention is not limited to specific gravity and density measurements and indications. In a device like an aneroid barometer, for example, the principle of utilizing flux pulses may be employed to advantage in the transmission of the measurement effected by the instrument to a distant point, or in the application of the measurement to operating mechanism. The pulse actuated output shaft does not disturb the measuring accuracy of the barometer, itself, nor does friction prevent the adjustment of such output shaft into coincidence with the barometer.

Other objects and advantages will hereinafter appear.

In the drawing forming part of this specification,

Figure 3 is a view in end elevation of the instrument of Figure 2;

Figure 5 is an electrical diagram indicating one practical and advantageous way in which the measurement secured by the instrument of Figures 2 and 3 may be automatically utilized.

If a balancing float device be constructed having its center of rotation $Cr$, its center of mass $Cm$, and its center of buoyancy $Cb$ at triangularly related points, it can be readily shown that the angular position assumed by the device when submerged in liquid is a function of the density or of the specific gravity of the liquid. If the distance from $Cr$ to $Cb$ is called $L1$, the distance from $Cr$ to $Cm$ is called $L2$, the volume, mass and density of the balance are called, respectively, $V$, $M$ and $D$, the fixed angle between $CrCb$ and $CrCm$ is called $A$, and the variable angle of the line $CrCb$ above the horizontal is called $x$ ($x$ being considered negative if below the horizontal), then:

$$DVL_1 \cos x = ML_2 \cos(A-x)$$

$$D = \frac{ML_2}{VL_1} \cdot \frac{\cos A \cos x + \sin A \sin x}{\cos x}$$

$$= \frac{ML_2 \cos A}{VL_1}(1+\tan A \tan x)$$

Substituting $K$, a constant, for $$\frac{ML_2 \cos A}{VL_1}$$

$$D = K(1+\tan A \tan x) \qquad (1)$$

Thus, when $x$ equals zero, $D$ equals $K$; when $x$ is positive, $D$ is greater than $K$; and when $x$ is negative, $D$ is less than $K$. When $A$ and $x$ are complementary in value and $x$ is positive, their tangents are reciprocals and $D$ is equal to $2K$, and when $A$ and $x$ are complementary and $x$ is negative, $D$ would be equal to zero.

Although the departure of density from $K$ is proportional to $\tan x$ rather than $x$ itself, there are applications in which, for practical purposes, the law may be treated as a linear one without substantial error. There are many important liquids (hydrocarbon fuels and lubricants, for example) for which an instrument may be specially designed so that an intermediate or mean specific gravity of .8 will cause the angle $x$ to be zero.

Let us assume that the design is such that $\tan A$ equals one. When $x$ equals .15 radian (about 8° 35'), in Equation 1 $1+\tan A \tan x$ would be 1.15114, which is less than $1.001(1+x \tan A)$ or 1.15115. Therefore $x$ could be used for $\tan x$ up to $x=+.15$. If $K$ were equal to eight-tenths, this would be equivalent to a specific gravity range from .68 to .92 spread over more than seventeen degrees of rotation with a maximum error of less than one-tenth percent. This is a practical degree of accuracy for many purposes. When it is not sufficiently precise the error can be compensated by employing a suitably taper wound resistor in the output circuit of the instrument.

Figure 2:
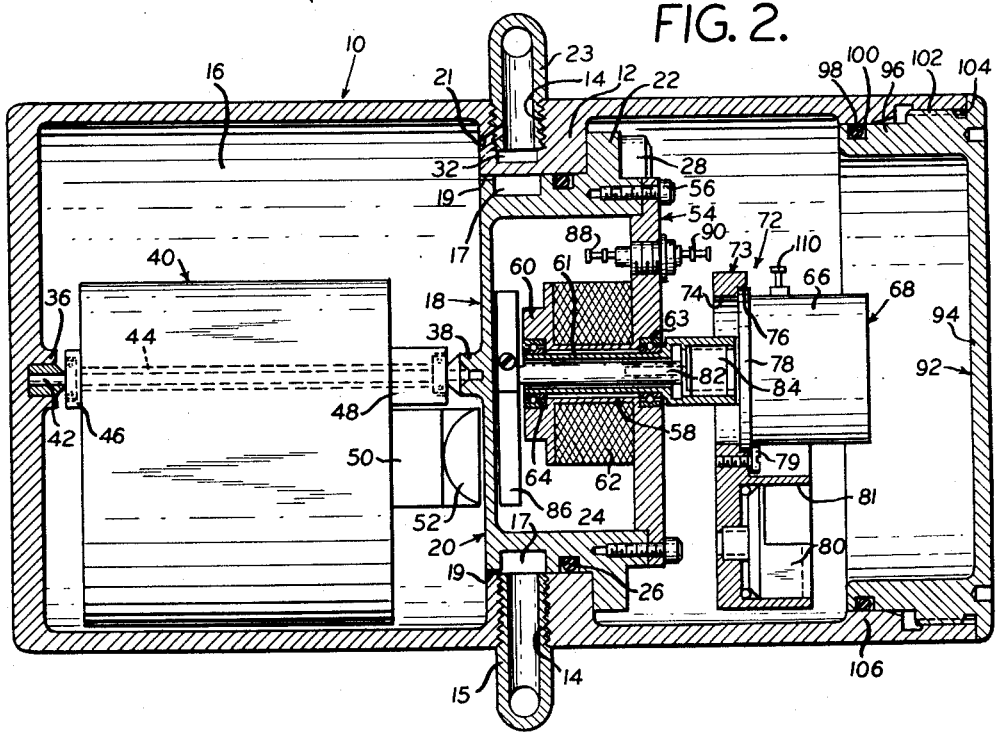
Figure 2 is a view in sectional side elevation of an illustrative instrument embodying features of the invention.

The instrument of Figures 2 and 3 comprises a generally cylindrical casing 10 which has an internal circumferential flange 12 disposed substantially midway of its length. The flanged portion is provided at the bottom with a threaded recess 14 through which the casing may be supported from a tank and placed in communication with the interior of the tank by means of a pipe 15. It is important that the axis of the casing be horizontally disposed. The opening 14 communicates with an annular space 17, and thence through a circular opening 19 with a liquid chamber 16 which constitutes substantially the rear half of the interior of the casing 10. Liquid is conducted from the chamber 16 through a discharge passage 21 and a pipe 23 which leads back to the tank.

The chamber 16 is separated from the forward end of the casing 10 by the flange 12 and by a subsidiary casing 18 which is mounted upon and within the flange 12. The subsidiary casing 18 comprises a cup-shaped body member 20 whose body fits into the flange 12. The body member 20 is formed with a circumferential flange 22 and with a circumferential channel 24. The channel 24 receives an O-ring 26 for sealing the space between the flange 12 and the body member 20. The body member 20 is secured through the flange 22 to the flange 12 by any suitable fastening means, such as headed screws 28.

The rear end of the casing 10 and the vertical wall of the member 20 are formed with central bosses, 36 and 38 respectively, through which bearing support is provided for a cylindrical balancing float 40. A horizontal bearing pin 42 is supported in the bosses 36 and 38. The pin 42 extends through a sleeve 44 and through bearing extensions 46 and 48 of the balancing float 40, serving to support the balancing float through stainless steel ball bearings which are carried by the bearing extensions 46 and 48.

Figure 1:
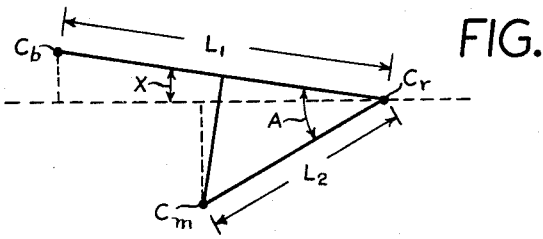
Figure 1 is a diagrammatic view illustrating the action of the balancing float when submerged in a liquid.

The cylindrical body of the balancing float 40 is hollow, but it is sealed against communication with the interior of the chamber 16. It is eccentrically mounted on the pin 42, and it is unevenly loaded in such fashion that the centers of mass, buoyancy and rotation, $C_m$, $C_b$ and $C_r$, are related in a manner like that shown in Figure 1, the moment of the force of buoyancy opposing the moment of the force of gravity. The cylindrical body of the balancing float 40 is desirably made of Invar, in order to hold to a minimum inaccuracies due to expansion and contraction of the balancing float in response to changes of temperature.

The balancing float 40 carries at its forward end a permanent magnet 50 whose poles are disposed in radial alignment with the center of rotation of the balancing float 40. In front of the magnet 50 the balance also carries a soft iron pole piece 52 of high permeability but low retentivity. The magnet 50 and the pole piece 52 always move in unison with the balancing float 40. They establish a concentrated magnetic field through the rear wall of the subsidiary casing member 20, the location of the field being a function of the density of the liquid in the chamber 16.

The subsidiary casing 18 is closed at the front by a cover member 54 which is secured to the member 20 by suitable fasteners such as headed screws 56. The cover member 54 includes an axially disposed sleeve extension 58 which is enlarged at its rear end to form a circumferential flange 60 of substantial diameter. A coil 62 is wound on the sleeve 58 between the body portion of the cover member 54 and the flange 60. Ball bearings 63 and 64, mounted in the body of the cover member 54 and in the flange 60, rotatively support a bearing sleeve 61 which is unitary with, and supports the body 66 of a variable resistance device or potentiometer 68, by which a slide wire 70 is carried.

A pendulum 72 includes a member 73 which is formed in its upper portion with an opening 74 and with a rabbet 76 around the opening. The rabbet 76 receives a flange 78 of potentiometer body 66. The body 66 and the pendulum 72 are rotatively adjustable, but when a desired adjustment has been secured the parts may be fixed in relation to one another by threading home into the member 73 a headed clamping screw 79 whose head bears against the flange 78 of the body 66 and clamps it to the member 73. The pendulum 72 includes an eccentric weight 80 which is received in a circular opening 81 of the member 73. The weight is frictionally secured in the opening 81 and may be turned to effect a fine adjustment of the potentiometer slide wire relative to the arm in a datum position of the balancing float 40.

A shaft 82 extends through the sleeve 63, being rotatively supported in an enlargement of the sleeve. The shaft 82 has fast upon its forward end the slide arm 84 of potentiometer 68, which arm is desirably counterbalanced. The shaft 82 has fixed upon its rear end an armature bar 86. The ends of coil 62 are connected with a half-wave rectifier of 60-cycle 110-volt current, through a pair of binding posts 88 and a pair of binding posts 90. Thus, sixty pulses of flux occur in every second. The flux from coil 62 is concentrated in the shaft 82 and in the armature 86. This pulsating flux augments the coupling between the pole piece 52 and the armature 86 and thereby tends to overcome the frictional drag throughout the system.

The functioning of these parts may be visualized as follows: During the "on" time of the induced field the potentiometer slide 84 is pulled in a direction to line up the armature 86 with the pole piece 52 by a force substantially greater than that required to overcome potentiometer friction. An equal and opposite force acts upon the balancing float 40 at the same time, but since the inertia of the balancing float 40 is much larger than that of the potentiometer arm 84, the latter moves through a relatively large angle and the former through a relatively small angle. The net result is to bring the potentiometer arm 84 a comparatively long distance toward the balancing point and the balancing float 40 a comparatively short distance away from the balancing point.

During the "off" time of the induced field, the force between the balancing float 40 and the potentiometer arm 84 is small, and the forces of gravity and buoyancy tend to restore the balancing float 40 to the true balancing position, while the potentiometer arm 84 remains stationary. The above description covers one complete cycle of one-sixtieth second duration. Each successive cycle brings the potentiometer arm 84 closer to the true balancing position, so that for practical purposes a substantially true position is attained by the potentiometer arm in a total time of the order of one second.

A protective cover 92 is provided for the open end of the casing 10. The cover 92 includes a body portion 94 and a flanged portion 96. The flange 96 is provided with a circumferential channel 98 in which an O-ring 100 is lodged. The flange 96 carries ribs 102 which fit into slots 104 of the casing 10. The O-ring 100 bears outward against an internal flange 106 of the casing 10. The flange 106 has a sloping, conical face 108 at its forward margin for crowding the O-ring into the smaller diameter portion of the flange to provide a tight seal and to hold the cover frictionally in place.

While a potentiometer has been shown and described, it is evident that by the mere substitution of a pointer and scale for the slide and slide wire, a direct reading instrument could be had. It will also be apparent that the variable resistance device could take the form of a rheostat rather than a potentiometer.

The instrument as thus far described embodies the principal novelty of the invention. The slide and slide wire of the variable resistance device may be used either to actuate a direct reading density meter or specific gravity meter, or it may be used automatically to apply a specific gravity factor either to signal voltage furnished by a volumetric flowmeter or to reference voltage against which the flowmeter signal voltage is balanced.

Figure 4:
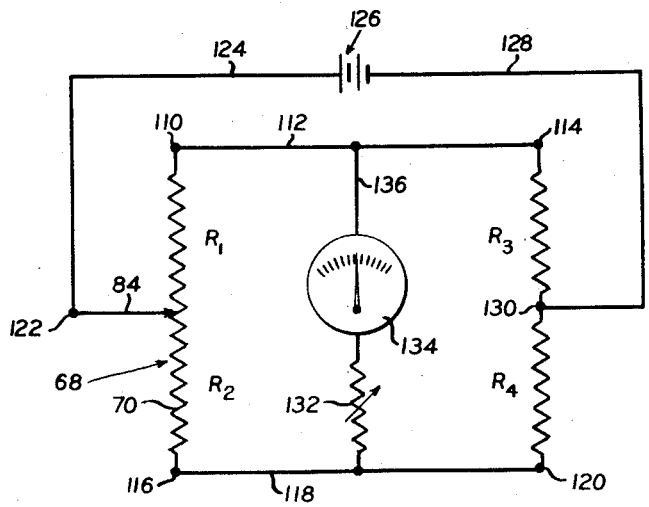
Figure 4 is an electrical diagram showing how the instrument of Figures 2 and 3 may be used to supply signal voltage to a direct reading specific gravity meter.

An illustrative application of the device described to a direct reading density meter or specific gravity meter is illustrated in Figure 4. As shown in Figure 4, the potentiometer structure is embodied in what is essentially a Wheatstone bridge circuit. The potentiometer slide wire 70, which is designated R1 and R2 in Figure 4 has its terminal 110 connected through a conductor 112 to a terminal 114 of resistor R3, and its terminal 116 connected through a conductor 118 to a terminal 120 of resistor R4. The potentiometer slide arm 84 has its terminal 122 connected through a conductor 124 to a battery 126 or other steady source of D.C. potential. The opposite side of the battery 126 is connected through a conductor 128 with the junction 130 of resistors R3 and R4. The conductor 118 is connected to the conductor 112 through a variable resistor 132, a voltmeter 134 graduated in terms of density or specific gravity or both, and a conductor 136. The condition of balance is chosen to correspond to that condition in which the angle $x$ is equal to 0. The scale of the instrument is made non-linear to take care of the non-linearity of the relationship of specific gravity to the angle $x$. The scale is, however, symmetrical with respect to the balancing point. The resistor 132 may be adjusted for re-calibrating the instrument when the response exceeds, or falls below that called for by the scale.

An illustrative application of the device for automatically determining and applying a specific gravity factor in an instrument of the Potter flowmeter type is shown diagrammatically in Figure 5.

A source 138 of steady D.C. reference voltage is connected to terminal 110 through a conductor 140 and to terminal 116 through conductors 142 and 144. The slide arm terminal 122 is connected through a conductor 123 with one terminal of the slide wire 146 of a self-balancing potentiometer 148, the opposite end of the slide wire 146 being connected to the conductor 142. A signal device S may include as a primary sensor a Potter flowmeter, which generates alternating current whose frequency is proportional to the volumetric rate of flow of the liquid to be measured, and the usual amplifiers and converter for deriving therefrom a D.C. voltage proportional to the volumetric rate of flow. The device S is shown as connected at one side to the conductor 142 and at the other side through a conductor 150 to the midpoint 162 of a transformer primary 154. As is well understood, the voltage from the signal device S at point 152 is balanced against the voltage from source 138 at slide 156. Any unbalance will cause current to flow in one direction or the other between the slide 156 and the point 152. This out-of-balance current is converted to 60-cycle alternating current in a well known manner through a converter 158 which comprises a vibratory reed 160, a polarizing winding 162 energized from a 60-cycle A.C. source, parallel conductors 164 and 166, the two halves of transformer primary 164 and the transformer secondary 168. The alternating current thus derived is put through amplifiers 170 and 172 and transmitted through conductors 174 and 176 to one winding of a balancing motor 178. A crossed winding of the balancing motor 178 is energized from the same source which energizes the winding 162. The balancing motor shaft 180 is mechanically connected to drive the slide 156 in a direction to establish or restore balance of the potentiometer 148 and to actuate the indicator 182 of an instrument 184 which is calibrated to reveal the rate of liquid flow in pounds per hour.

It will be noted that the specific gravity factor is shown applied to the reference voltage in Figure 5. Since the relationship of the angle $x$ to specific gravity is not a linear relationship, the winding 70a must be tapered to compensate for the lack of linearity. The specific gravity factor could have been applied instead to the D.C. voltage output of signal device S. In that case the adjustment required is reciprocal in character to that applied in Figure 5, and the taper of the potentiometer slide wire is modified accordingly.

I have described what I believe to be the best embodiments of my invention. I do not wish, however, to be confined to the embodiments shown, but what I desire to cover by Letters Patent is set forth in the appended claims.

I claim:

1. In an instrument for automatically obtaining a measurement which is a function of the specific gravity of a liquid, in combination, means forming a liquid chamber, a balancing float mounted in the chamber with capacity for rocking movement about a horizontal axis, said balancing float being constructed and arranged to assume an angular at-rest position which is a function of the specific gravity of the liquid in the chamber, a radially disposed, highly permeable member forming part of the balancing float and disposed in one end of the chamber, an output shaft located outside the chamber in alignment with the rotational axis of the balancing float, a radially disposed permeable bar carried by said shaft in proximity to said chamber, a coil surrounding the shaft, and means for energizing the coil intermittently to provide bursts of flux which draw the output shaft step by step into coincidence with the at-rest position of the balancing float.

2. In an instrument for automatically obtaining a measurement which is a function of the specific gravity of a liquid, in combination, means forming a liquid chamber, a balancing float mounted in the chamber with capacity for rocking motion about a horizontal axis, said balancing float having its centers of rotation, mass and buoyancy triangularly related so that its angular at-rest position is a function of the specific gravity of the liquid in the chamber, a permanent magnet and a radially disposed pole piece secured to, and forming part of, the balancing float, an output shaft located outside the chamber in alignment with the rotational axis of the balancing float, a radially disposed permeable bar carried by said shaft adjacent the chamber, a coil surrounding the shaft, and means for energizing the coil intermittently to provide bursts of flux which draw the output shaft step by step into coincidence with the at-rest position of the balancing float.

3. In an instrument for automatically obtaining a measurement which is a function of the specific gravity of a liquid, in combination, means forming a liquid chamber, a balancing float mounted in the chamber with capacity for rocking motion about a horizontal axis, said balancing float having its centers of rotation, mass and buoyancy triangularly related so that its angular at-rest position is a function of the specific gravity of the liquid in the chamber, a permanent magnet and a radially disposed pole piece secured to, and forming part of, the balancing float, an output shaft located outside the chamber in alignment with the rotational axis of the balancing float, a radially disposed permeable bar carried by said shaft adjacent the chamber, a coil surrounding the shaft, means for energizing the coil intermittently to provide bursts of flux which draw the output shaft step by step into coincidence with the at-rest position of the balancing float, an electrical resistance instrument comprising rotor and stator members, a slide and slide wire each carried by one of the members, the rotor being mounted upon and driven by said output shaft, and means pendulously maintaining the stator in a datum position.

4. In an instrument for automatically obtaining a measurement which is a function of the specific gravity of a liquid, in combination, means forming a liquid chamber, a balancing float mounted in the chamber with capacity for rocking motion about a horizontal axis, said balancing float having its centers of rotation, mass and buoyancy triangularly related so that its angular at-rest position is a function of the specific gravity of the liquid in the chamber, a permanent magnet and a radially disposed pole piece secured to, and forming part of, the balancing float, an output shaft located outside the chamber in alignment with the rotational axis of the balancing float, a radially disposed permeable bar carried by said shaft adjacent the chamber, a coil surrounding the shaft, means for energizing the coil intermittently to provide bursts of flux which draw the output shaft step by step into coincidence with the at-rest position of the balancing float, an electrical resistance instrument comprising rotor and stator members, a slide and slide wire each carried by one of the members, the rotor being mounted upon and driven by said output shaft, a pendulum coaxial with the stator and rotatively adjustable with reference thereto, and means for securing the stator in a desired angularly adjusted relation to the pendulum so that it will be held in a prescribed datum position by the pendulum.

5. In an instrument for automatically obtaining a measurement which is a function of the specific gravity of a liquid, in combination, means forming a liquid chamber, a balancing float mounted in the chamber with capacity for rocking motion about a horizontal axis, said balancing float having its centers of rotation, mass and buoyancy triangularly related so that its angular at-rest position is a function of the specific gravity of the liquid in the chamber, a permanent magnet and a radially disposed pole piece secured to, and forming part of, the balancing float, an output shaft located outside the chamber in alignment with the rotational axis of the balancing float, a radially disposed permeable bar carried by said shaft adjacent the chamber, a coil surrounding the shaft, means for energizing the coil intermittently to provide bursts of flux which draw the output shaft step by step into coincidence with the at-rest position of the balancing float, a potentiometer comprising rotor and stator members, a slide and slide wire each carried by one of the members, the rotor being mounted upon and driven by said output shaft, a pendulum coaxial with the stator and rotatively adjustable with reference thereto, means for securing the stator in a desired angularly adjusted relation to the pendulum so that it will be held in a prescribed datum position by the pendulum, and an eccentric weight rotatively adjustable, in the lower end of the pendulum.

6. In an instrument for automatically obtaining a measurement which is a function of the specific gravity of a liquid, in combination, means forming a liquid chamber, a balancing float mounted in the chamber with capacity for rocking motion about a horizontal axis, said balancing float having its centers of rotation, mass and buoyancy triangularly related so that its angular at-rest position is a function of the specific gravity of the liquid in the chamber, a permanent magnet and a radially disposed pole piece secured to, and forming part of, the balancing float, an output shaft located outside the chamber in alignment with the rotational axis of the balancing float, a radially disposed permeable bar carried by said shaft adjacent the chamber, a coil surrounding the shaft, means for energizing the coil intermittently to provide bursts of flux which draw the output shaft step by step into coincidence with the at-rest position of the balancing float, an electrical resistance instrument comprising rotor and stator members, and a slide and slide wire each carried by one of the members, the rotor being mounted upon and driven by said output shaft, a direct reading density meter, and a Wheatstone bridge circuit across which the density meter is bridged, said circuit including the slide wire as two of its resistance arms, with the slide dividing said arms, and a source of fixed voltage connected to the bridge.

7. In an instrument for automatically obtaining a measurement which is a function of a property or condition, in combination, a primary sensor mounted for turning movement about a fixed axis, said sensor being constructed and arranged to assume an angular position which is a function of the property or condition, a radially disposed, highly permeable member forming part of the sensor, an output shaft located in alignment with the rotational axis of the sensor, a radially disposed permeable bar carried by said shaft, a coil surrounding the shaft, and means for energizing the coil intermittently to provide bursts of flux which draw the output shaft step by step into coincidence with the at-rest position of the sensor.

8. In an instrument for automatically obtaining a measurement which is a function of a property or condition, in combination, a primary sensor mounted for turning movement about a fixed axis, said sensor being constructed and arranged to assume an angular position which is a function of the property or condition, a permanent magnet and a radially disposed pole piece secured to, and forming part of, the sensor, an output shaft located in alignment with the rotational axis of the sensor, a radially disposed permeable bar carried by said shaft, a coil surrounding the shaft, and means for energizing the coil intermittently to provide bursts of flux which draw the output shaft step by step into coincidence with the at-rest position of the sensor.

9. In an instrument for automatically obtaining a measurement which is a function of the specific gravity of a liquid, in combination, means forming a liquid chamber, a balancing float mounted in the chamber with capacity for rocking motion about a horizontal axis, said balancing float having its centers of rotation, mass and buoyancy triangularly related so that its angular at-rest position is a function of the specific gravity of the liquid in the chamber, a permanent magnet and a radially disposed pole piece secured to, and forming part of, the balancing float, an output shaft located outside the chamber in alignment with the rotational axis of the balancing float, a radially disposed permeable bar carried by said shaft adjacent the chamber, a coil surrounding the shaft, means for energizing the coil intermittently to provide bursts of flux which draw the output shaft step by step into coincidence with the at-rest position of the balancing float, an electrical resistance instrument comprising rotor and stator members, and a slide and slide wire each carried by one of the members, the rotor being mounted upon and driven by said output shaft, and a resistance measuring circuit including a source of electrical potential, the slide and slide wire connected in series therewith, and a direct reading instrument in circuit with the slide and slide wire whose readings reflect the relative positions of the slide and slide wire.

10. An instrument for automatically indicating the mass rate of flow of a liquid comprising, in combination, means furnishing a signal voltage proportional to the volumetric flow of the liquid to be measured, means furnishing a reference voltage, means automatically responsive to the liquid, itself, to apply a specific gravity factor to one of said voltages, a potentiometer in which the reference and signal voltages are compared, a balancing motor responsive to any out-of-balance condition of the potentiometer to restore balance thereof, and mass flow indicating means responsive to the output of the balancing motor, the means automatically responsive to the liquid to apply a specific gravity factor comprising a balancing float submerged in the liquid and having its centers of rotation, mass and buoyancy so related that it is caused to assume a rotative position which is a function of the specific gravity of the liquid, the potentiometer having a stator member and a rotor member, and including a slide and a slide wire each carried by one of said members, and means for intermittently effecting a strong magnetic coupling between the balancing float and the potentiometer rotor to bring about a relative adjustment of the slide and slide wire corresponding to the balanced position of the balancing float thereby to introduce the desired specific gravity factor.

References Cited in the file of this patent

UNITED STATES PATENTS

| | | |
|---|---|---|
| 1,602,444 | Naiman | Oct. 12, 1926 |
| 2,082,539 | Fischer | June 1, 1937 |
| 2,221,943 | Fischer | Nov. 19, 1940 |
| 2,743,340 | Zoltanski | Apr. 24, 1956 |
| 2,749,754 | Linahan | June 12, 1956 |

FOREIGN PATENTS

| | | |
|---|---|---|
| 497,889 | Italy | Sept. 24, 1954 |